(12) United States Patent
Kurtz (10) Patent No.: US 6,612,179 B1
(45) Date of Patent: Sep. 2, 2003

(54) METHOD AND APPARATUS FOR THE DETERMINATION OF ABSOLUTE PRESSURE AND DIFFERENTIAL PRESSURE THEREFROM

(75) Inventor: Anthony D. Kurtz, Ridgewood, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 0 days.

(21) Appl. No.: 09/338,145

(22) Filed: Jun. 23, 1999

(51) Int. Cl.[7] .............................................. G01L 9/06
(52) U.S. Cl. ........................................................ 73/727
(58) Field of Search .......................... 73/720, 721, 722, 73/723, 724, 725, 726, 727, 756

(56) References Cited

U.S. PATENT DOCUMENTS 4,222,277 A * 9/1980 Kurtz et al. .................... 73/721
4,347,745 A * 9/1982 Singh ............................. 73/721
4,528,855 A * 7/1985 Singh ............................. 73/721

* cited by examiner

Primary Examiner—William Oen
(74) Attorney, Agent, or Firm—Duane Morris, LLP (57) ABSTRACT

A combination absolute and differential pressure sensing device including a plurality of absolute pressure transducers, each transducer including a plurality of half bridge piezoresistive structures and a device for selectively coupling at least one of the plurality of half bridge piezoresistive structures of a first one of the absolute pressure transducers to at least one resistor to form a half-active full bridge structure adapted to measure an absolute pressure and at least one other of the plurality of half bridge piezoresistive structures of the first one of the plurality of absolute pressure transducers to at least one of the half bridge piezoresistive structure of a second one of the plurality of absolute pressure transducers to form a full bridge structure adapted to measure a differential pressure.

20 Claims, 10 Drawing Sheets

METHOD AND APPARATUS FOR THE DETERMINATION OF ABSOLUTE PRESSURE AND DIFFERENTIAL PRESSURE THEREFROM

FIELD OF INVENTION

The instant invention relates generally to pressure transducers and more particularly to a piezoresistive assembly adapted to simultaneously measure both absolute and differential pressures.

BACKGROUND OF INVENTION

Piezoresistive sensor structures are widely used in pressure or force measuring. Generally, the prior art is replete with a number of patents which describe various configurations and methods of fabricating piezoresistive pressure sensing devices.

Generally, a piezoresistive device includes a bridge pattern of resistors which are mounted or otherwise diffused on one side of a relatively thin diaphragm member. The diaphragm which may be fabricated from silicon, and deflects upon application of a pressure thereto causes the piezoresistors to vary their magnitude according to the deflection of the diaphragm.

Differential pressure measurements can be accomplished using a differential transducer which provides an output which is the difference between two pressures. In the particular case of a gage sensor one of these pressures is atmospheric pressure and the other pressure is the pressure to be measured. In the case of the absolute pressure transducer, the output is solely indicative of a pressure applied.

Presently there are many implementations that require the measurement of both absolute and differential pressures. It is unfortunately necessary to often duplicate sensors and/or complicate associated circuitry thus resulting in elevated costs of manufacture and maintenance.

Further, the demand for pressure measuring assemblies adapted for use in hostile (high temperature and/or highly corrosive for example) environments has grown in recent years.

Commonly assigned U.S. Pat. No. 4,222,277, filed Aug. 13, 1979, entitled "Media Compatible Pressure Transducer", teaches an absolute pressure transducer which is adaptable for use in various deleterious mediums. Therein, a single wafer contains a gage sensor configuration on one portion and an absolute sensor configuration on another adjacent portion.

However, both the absolute and gage sensors of the '277 are exposed to a single pressure. Accordingly, it is desirable, and the object of the present invention to provide a relatively inexpensive structure capable of measuring multiple absolute pressures and a differential pressure associated therewith. It is another object of the instant invention to provide a relatively inexpensive structure capable of measuring both absolute and differential pressures which is further adapted for prolonged use in a hostile environment.

SUMMARY OF INVENTION

A combination absolute and differential pressure sensing device including: two pressure transducers each respectively including two electrically separated half bridge piezoresistive structures; two resistors; and, a device for selectively coupling one of the half bridge piezoresistive structures of a first one of the absolute pressure transducers to two resistors to form a half-active full bridge structure adapted to measure an absolute pressure; and, one of the plurality of half bridge piezoresistive structures of the first one of the two absolute pressure transducers to one of the half bridge piezoresistive structures of a second one of the absolute pressure transducers to form a full bridge structure adapted to measure a differential pressure.

DETAILED DESCRIPTION OF THE INVENTION

Figure 1:
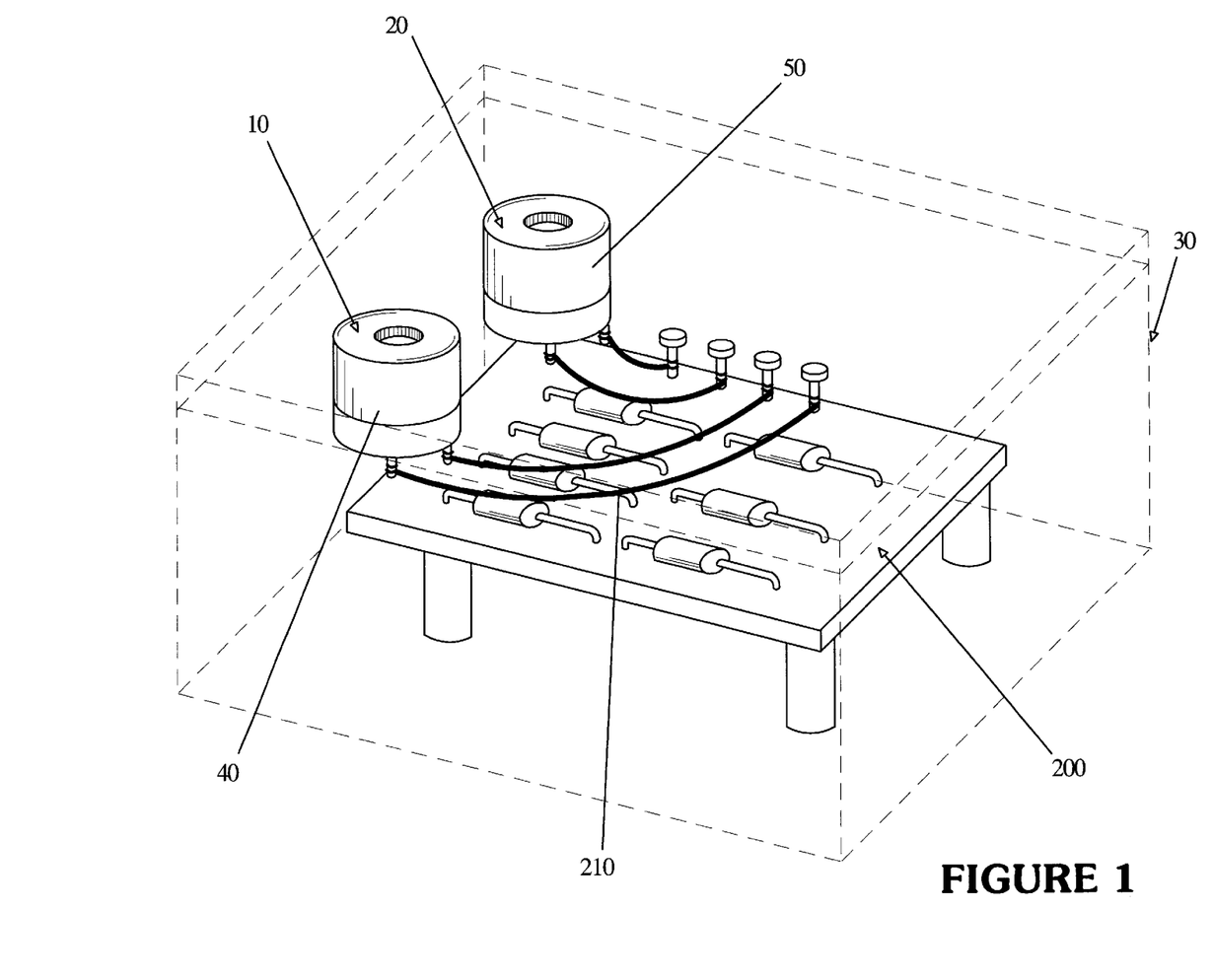
FIG. 1 illustrates a perspective view of a first embodiment of the present invention.
Figure 2:
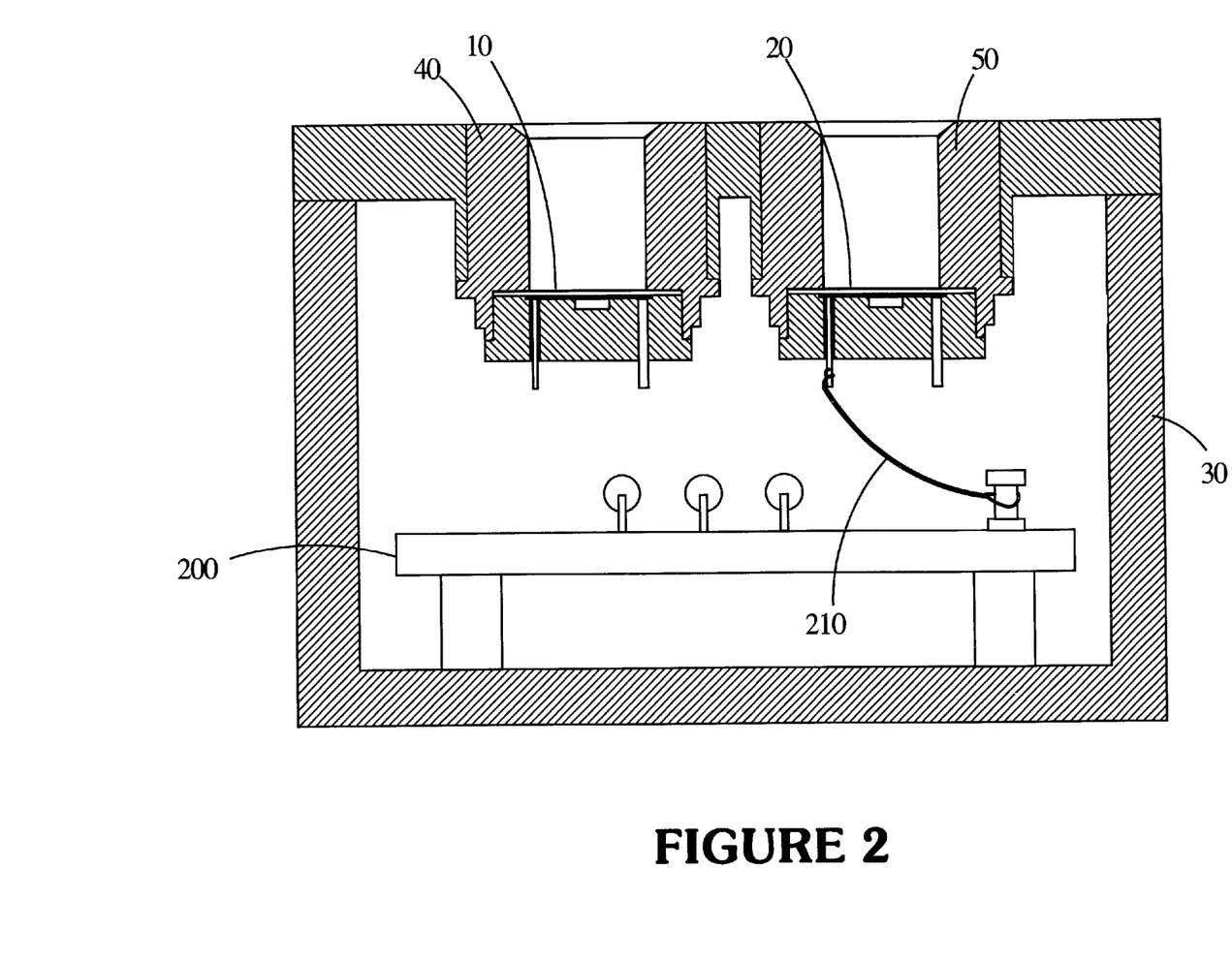
FIG. 2 illustrates a cross-section view of the embodiment of FIG. 1.

Referring now to the numerous figures wherein like references refer to like element of the invention, FIGS. 1 and 2 illustrate a preferred form of the invention including a set of two substantially identical piezoresistive absolute pressure sensors 10, 20 mounted in a common housing 30 with means of applying pressures separately to respective sensor housings 40,50. Alternatively, it should be recognized the sensors 10, 20 could of course be mounted in separate housings without effecting the operation of the present invention. The critical feature being that different pressures to be measured can be respectively applied to the two sensors 10, 20.

Figure 3:
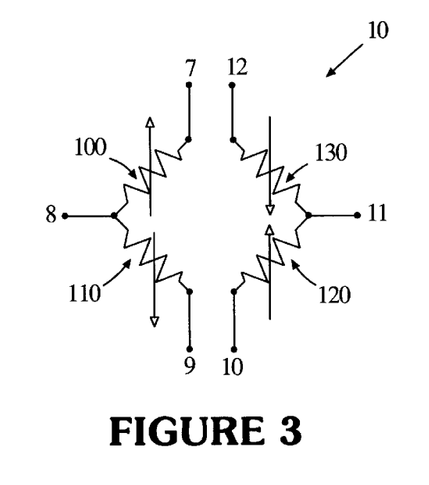
FIG. 3 illustrates a circuit incorporated into a first pressure sensor according to the present invention.
Figure 4:
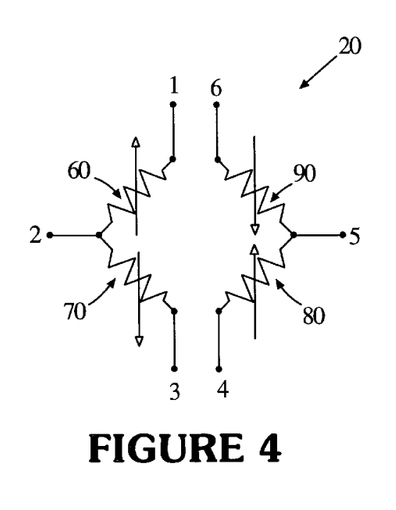
FIG. 4 illustrates a circuit incorporated into a second pressure sensor according to the present invention.

Referring now also to FIGS. 3 and 4, each sensor 10, 20 preferably includes four resistive elements (60, 70, 80, 90, and 100, 110, 120, 130) arranged in an open set of two uncoupled half-bridges. Preferably each resistive element in each sensor 10, 20 exhibits as close as possible a same percentage change of resistance when exposed to an identical pressure.

Figure 15:
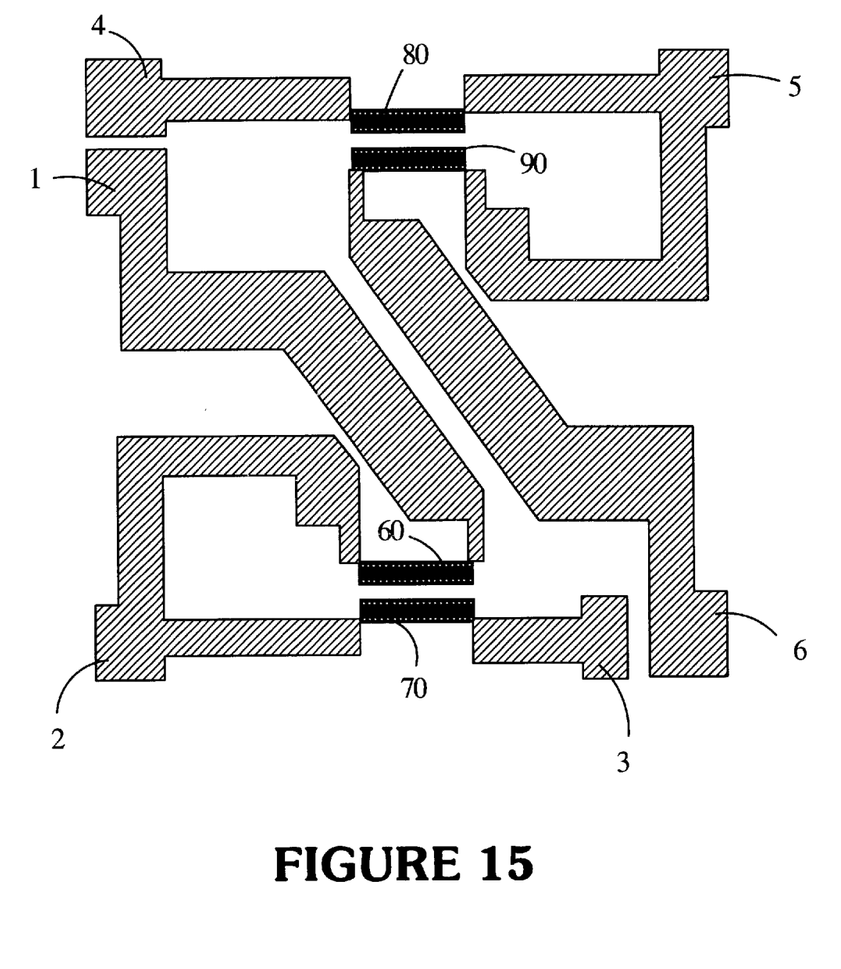
FIG. 15 illustrates an overview of a circuitry configuration which can be utilized according to the present invention.

Each sensor 10, 20 preferably also includes six contacts or pins (1, 2, 3, 4, 5, 6, and 7, 8, 9, 10, 11, 12) such that each resistive element (60, 70, 80, 90 and 100, 110, 120, 130) of each half-bridge can be connected to a contact (see for example FIG. 15).

It should be recognized that depending on the particular configuration of each sensor 10, 20 different resistive element (60, 70, 80, 90 and 100, 110, 120, 130) will either be subjected to compression or tension forces. The arrows associated with a resistive element designate associated forces for each particular resistive element. In other words, resistive elements having arrows pointed in a same direction are subject to a same compressive or tensile force and resistive elements having arrows pointed in opposite directions are each subjected to opposite forces (i.e. one tensile and one compressive). Thus, each half-bridge from each sensor 10, 20 can be interconnected to a half-bridge of the same sensor 10, 20 giving a fully active full bridge or interconnected to a half-bridge from the other sensor giving a full bridge which depending on which half-bridge of the second housing is used, either represents the sum or the difference of the pressures applied to each housing.

If a half-bridge from each sensor 10, 20 is interconnected to form a full-bridge, then the remaining half-bridge of either sensor 10, 20 can be interconnected with two fixed resistors to form a half-active full bridge. Thus, each remaining half-bridge can be coupled independently in this way to provide an output from each sensor 10, 20 that is proportional to the specific pressure applied to that particular sensor. Thus, by proper interconnection, if $P_1$ represents a pressure applied to the first pressure sensor 10 using the first port 40 and $P_2$ represents a pressure applied to the second pressure sensor 20 using the second port 50, the following outputs can be obtained by proper connections:

$$P_2 - P_1, \qquad (1)$$

$$P_2 + P_1, \qquad (2)$$

$$P_2, \qquad (3)$$

and $$P_1 \qquad (4)$$

These connections can be made by any suitable means, for example by electronic switching controlled by a microcontroller, integrated circuit or any other suitable configuration such as a mechanical switch or timer circuit. This can be accomplished for example using circuit 200 and leads 210.

Figure 5:
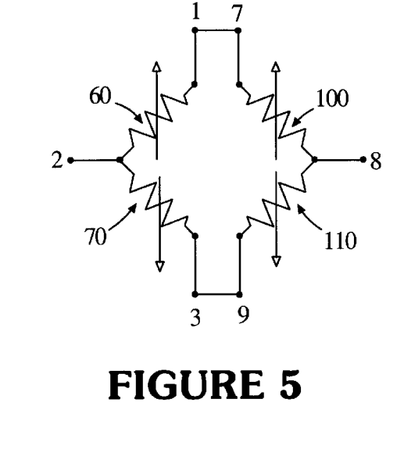
FIG. 5 illustrates an electronic interconnection of portions of the circuits of FIGS. 3 and 4 which can be utilized to determine a difference between pressures applied to the first and second pressure sensors.

Referring now also to FIG. 5, $P_2-P_1$ (1) is ascertained using a half-bridge from each sensor (resistive elements 60, 70 from sensor 20 and elements 100, 110 from sensor 10) which are connected to give an output representing the difference in pressure between $P_2$ and $P_1$.

Figure 6:
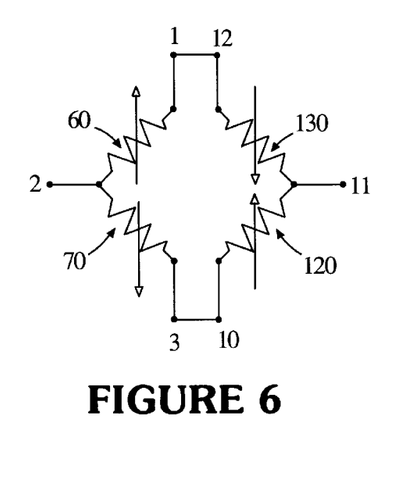
FIG. 6 illustrates an electronic interconnection of portions of the circuits of FIGS. 3 and 4 which can be utilized to determine a sum of pressures applied to the first and second pressure sensors.

Referring now also to FIG. 6, $P_2+P_1$ (2) is ascertained using the same half-bridge as in $P_2-P_1$ from the sensor 20 but using the half-bridge not used in $P_2-P_1$ from the $P_1$ sensor. (resistive elements 60, 70 from sensor 20 and elements 120, 130 from sensor 10).

Figure 7:
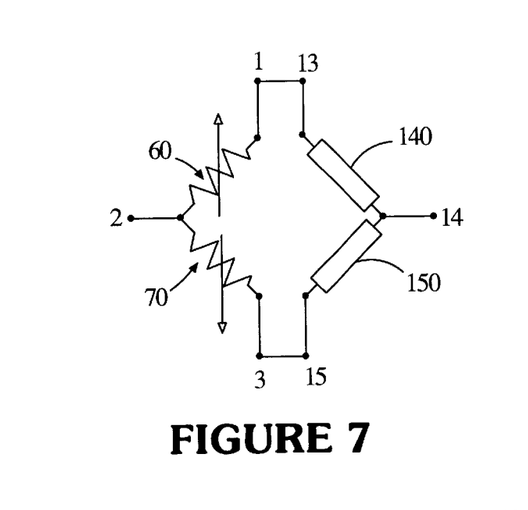
FIG. 7 illustrates an electronic interconnection of a portion of the circuit of FIG. 4 which can be utilized to determine a pressure applied to the second pressure sensor.

Referring now also to FIG. 7, $P_2$ is ascertained by interconnecting the half-bridge from the $P_2$ housing not used in $P_2-P_1$ and $P_2+P_1$ (resistive elements 80, 90 from sensor 20) to set, fixed resistors 140, 150.

Figure 8:
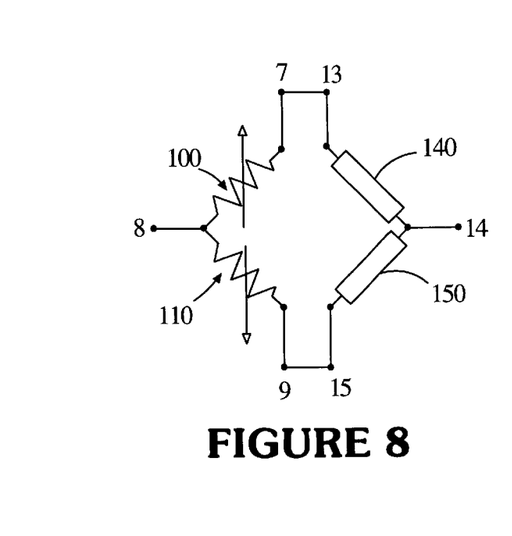
FIG. 8 illustrates an electronic interconnection of a portion of the circuits of FIG. 3 which can be utilized to determine a pressure applied to the first pressure sensor.

Finally, referring now also to FIG. 8, $P_1$ is found by interconnecting the half-bridge from the $P_1$ housing not used in $P_2-P_1$ (resistive elements 100, 110 from sensor 10) connected to the set of fixed resistors 140, 150. Alternatively, each sensor 10, 20 could of course have its own set of fixed resistors associated with it.

Figure 9:
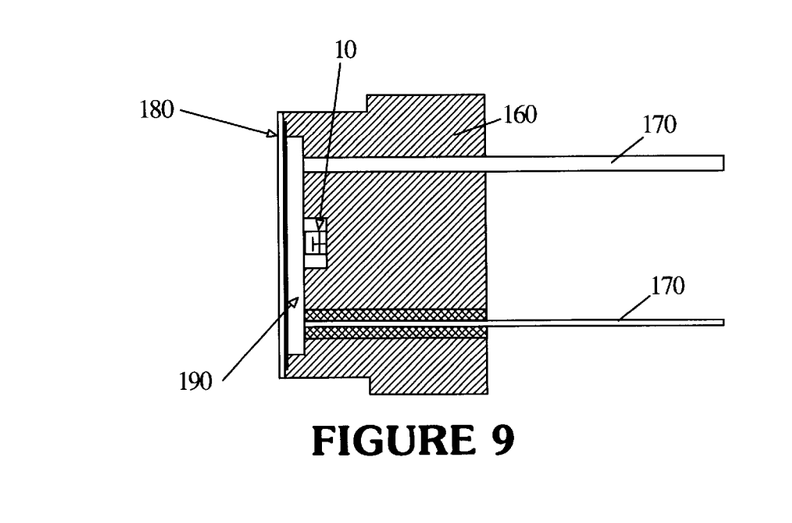
FIG. 9 illustrates a cross-section of a preferred configuration of a sensor chip, the isolation diaphragm and the oil filled cavity utilized according to the present invention.
Figure 10:
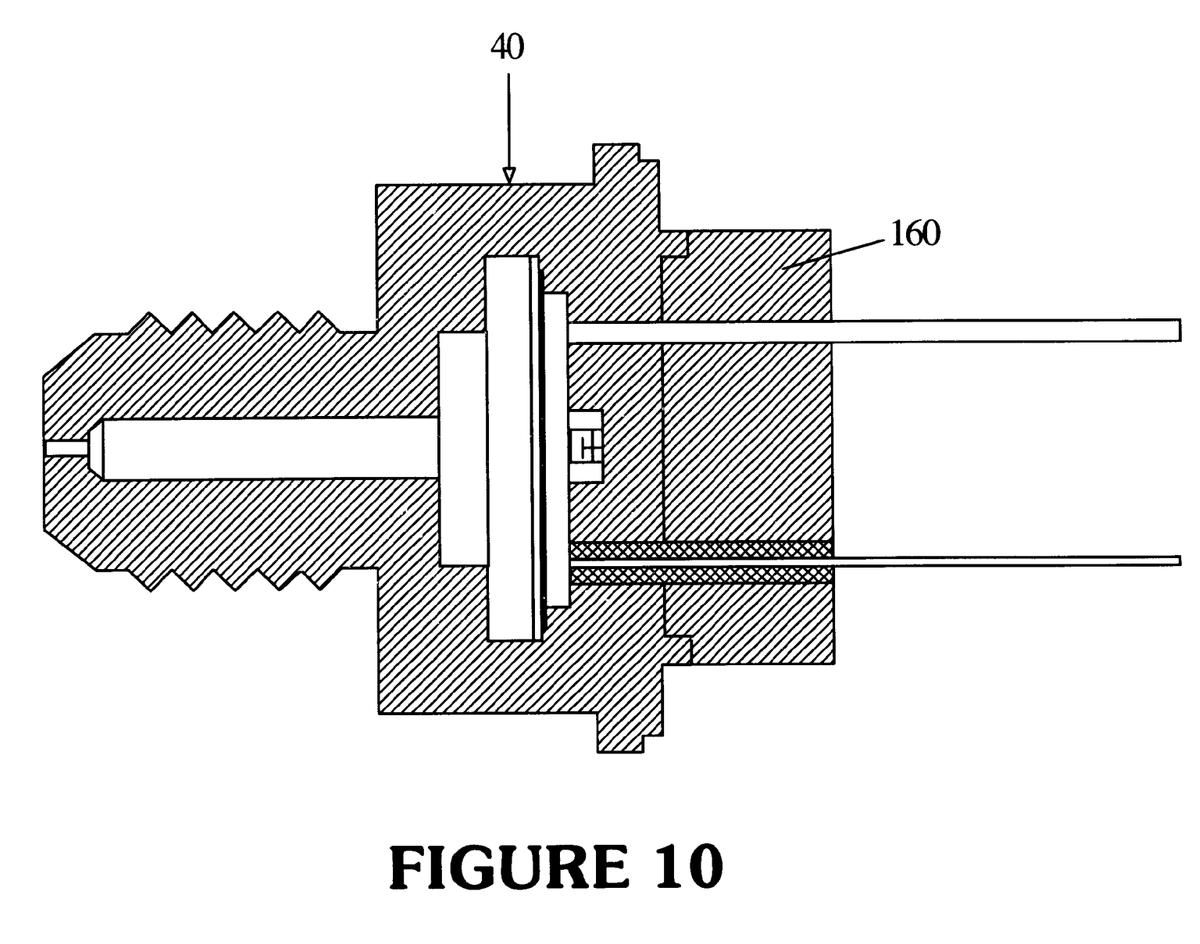
FIG. 10 illustrates a cross-section of a preferred configuration of a sensor chip, the isolation diaphragm, oil filled cavity and pressure port utilized according to the present invention.

Referring now also to FIGS. 9 and 10 in one preferred embodiment each sensor 10, 20 has a header 160 with eight (8) dielectrically isolated pins 170 on which the open bridge semiconductor piezoresistive sensor 10, 20 is mounted together with a port 40 suitably configured for attachment to a pressure source. The header 160 is preferably further made suitable for providing an isolation diaphragm 180 and oil-filled enclosure cavity 190, wherein the isolation diaphragm 180 acts on oil within the cavity 190 to impart to the semiconductor piezoresistive sensor 10, 20 the applied pressure while isolating the semiconductor sensor 10, 20 from a media associated with the pressure to be measured.

In any event, the semiconductor piezoresistive sensor 10, 20 is in and of itself an absolute sensor with its own internal reference cavity. Such a preferred configuration together with the sensor chip, the isolation diaphragm and the oil filled cavity is shown in FIG. 9 and is shown in FIG. 10 with a pressure port attached.

Figure 11:
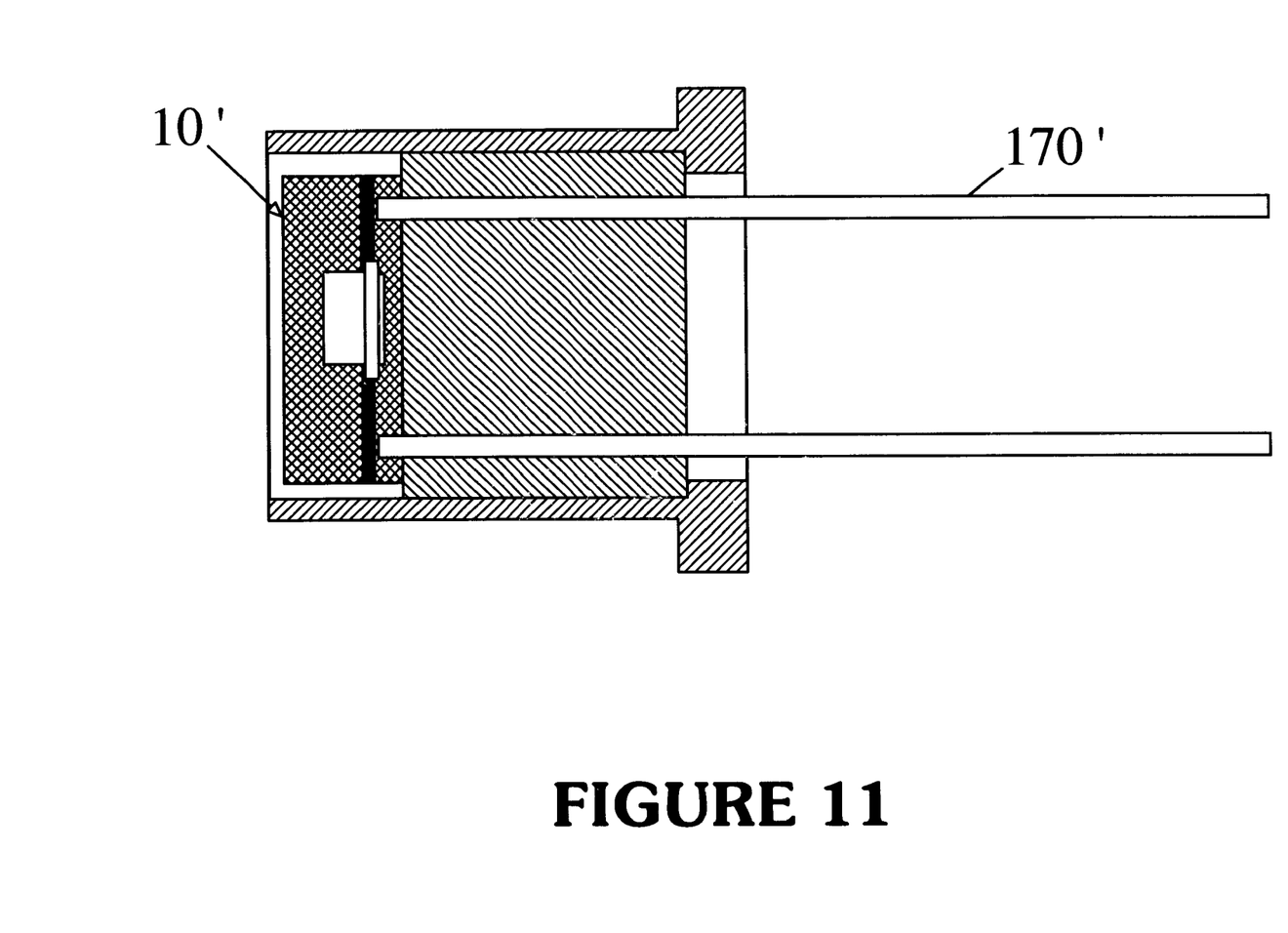
FIG. 11 illustrates an alternative embodiment of a pressure sensor and header assembly utilized according to the present invention.
Figure 12:
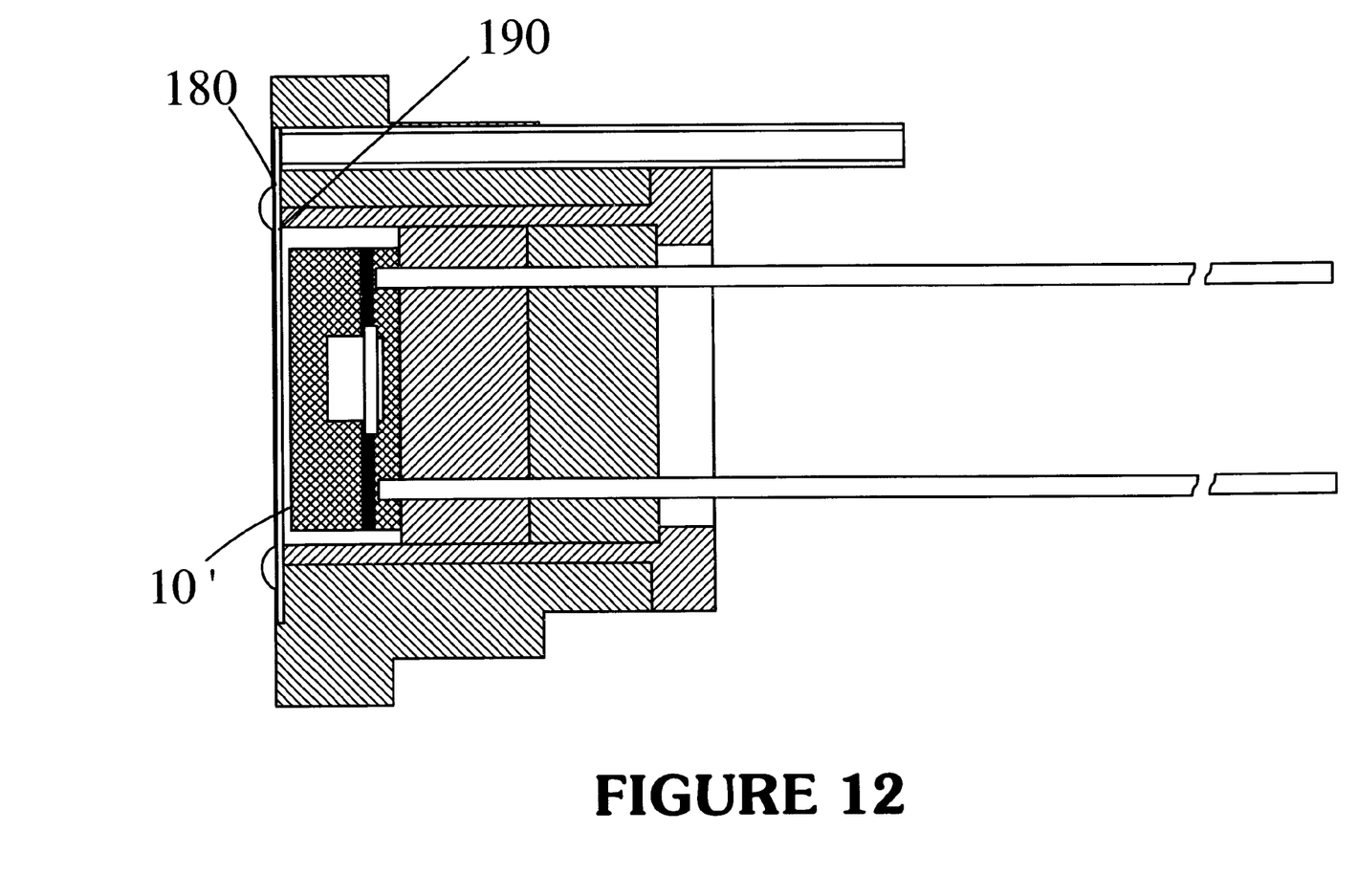
FIG. 12 illustrates the alternative embodiment of FIG. 11 further including an isolation diaphragm and oil filled cavity.
Figure 13:
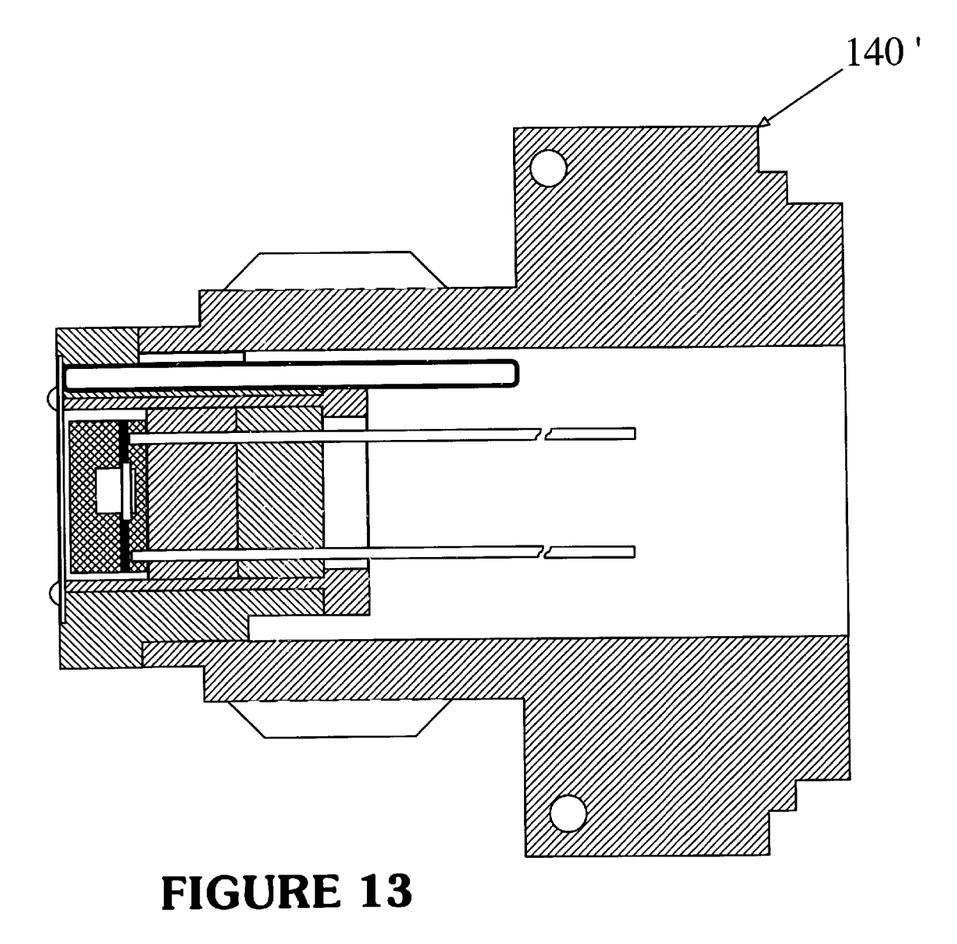
FIG. 13 illustrates a side view of the embodiment of FIG. 12 further including a port.

Referring now also to FIGS. 11 and 12 in a second preferred embodiment, a leadless sensor as described in copending U.S. patent application Ser. No. 09/160,976, entitled "Hermetically Sealed Ultra High Temperature Silicon Carbide Pressure Transducers and Method for Fabricating Same" and copending U.S. patent application Ser. No. 09/245,158, entitled "High Pressure Piezoresistive Transducer Suitable for Use in Hostile Environments and Method for Making the Same", the entire disclosures of which are hereby incorporated by reference, can be welded or otherwise affixed to the housing such that only the non-active side of the sensor is exposed to the pressure media. For severe environments it is clear that one can also provide means in the housing to provide for an isolation diaphragm and an oil cavity. This is shown in FIG. 11 and with a second header attached in FIG. 12 and a port 140' attached thereto in FIG. 13.

It should be recognized that the semiconductor sensors 10, 20 for this application preferably meet stringent requirements. Not only does each of the two sensors 10, 20, one adapted to receive $P_2$ and the other adapted to receive $P_1$, need to demonstrate a nearly identical relative resistance change as a function of applied pressure but moreover the linearity of change of output voltage with applied pressure must be as close to zero as possible (preferably<0.2% Full Scale). This requirement results from the realization that if $P_2$ is near the top of its range, one must get the same output for a given value of $P_2-P_1$ as when $P_2$ is nearer to the bottom of its range when $P_2-P_1$ are of the same value. Such a sensor is shown in FIG. 4 where it may be noted that an open bridge configuration having six contact points (1–6)is shown (see FIG. 15 also).

Figure 14:
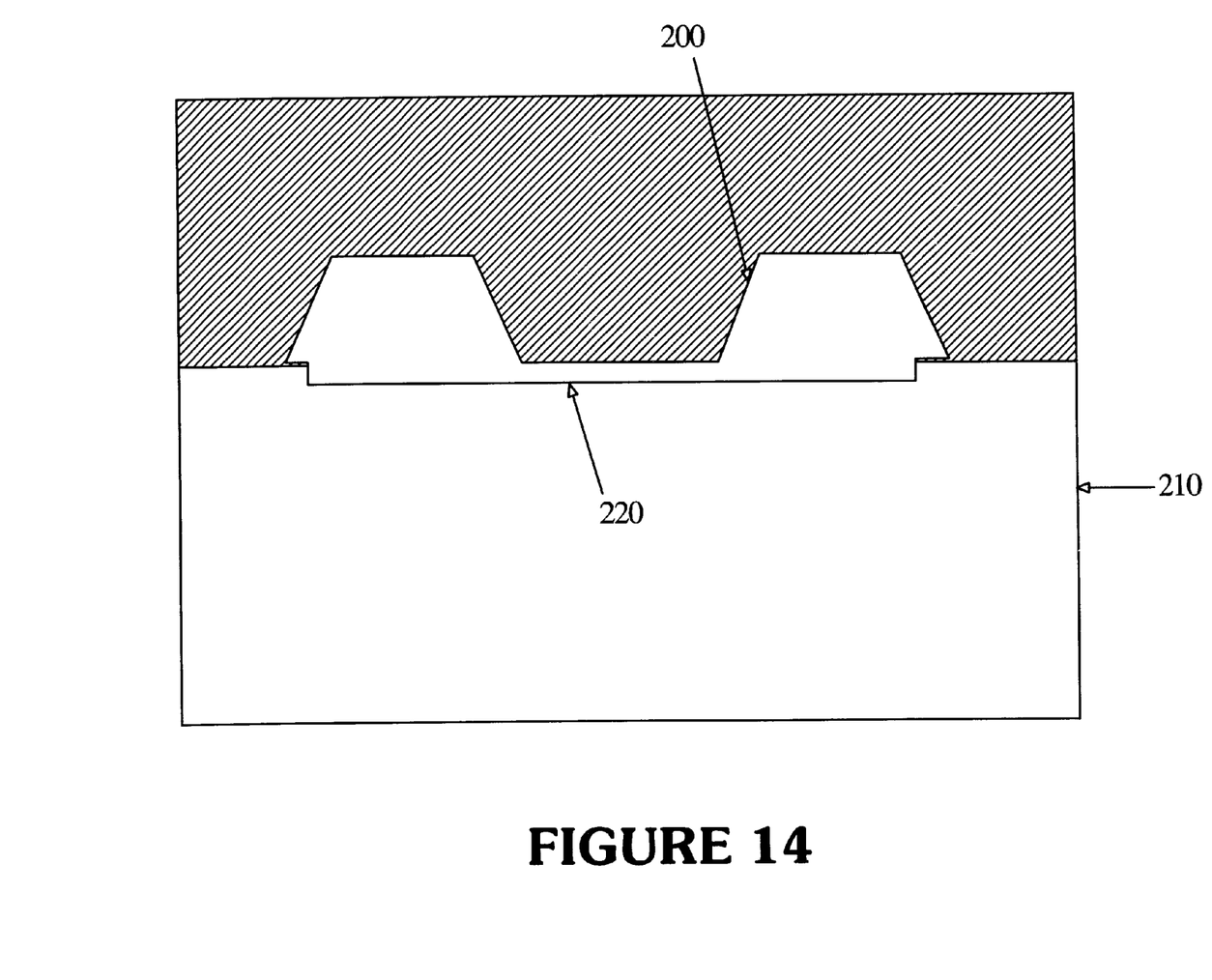
FIG. 14 illustrates a cross-sectional view of a preferred form of a sensor utilized according to the present invention.

The sensor as shown in a side view of FIG. 14 preferably includes a bossed deflecting portion 200, the presence of the boss 200 and the various widths of the thin deflecting portions serve to insure an ultra-linear voltage versus pressure relationship.

Additionally, by properly controlling the distance between the boss 200 and the glass 210, the boss 200 will stop against the glass 210 preventing an overpressure from fracturing the sensor 10, for example at point 220.

Referring now also to FIG. 15, therein is illustrated a top view of a circuitry structure which can be utilized to realize the four resistive elements (i.e. 60, 70, 80, 90) arranged in an open set of two uncoupled half-bridges which is utilized according to the present invention. Sensor 10 can of course be realized using an identical structure.

The present invention yields a number of unanticipated advantages, because both sensors are absolute there is no associated zero error in the differential measurement as the zero errors cancel out. Further, there is no media exposure to either side of the sensors since the front side of the sensor is protected by a metal isolation diaphragm, resulting in longer anticipated life, and internal stoppage is inherently provided for over-pressuring of the differential pressure transducer, as it is formed from two absolute pressure transducers.

Although the invention has been described in a preferred form with a certain degree of particularity, it is understood that the present disclosure of the preferred form has been made only by way of example, and that numerous changes in the details of construction and combination and arrangement of parts may be made without departing from the spirit and scope of the invention as hereinafter claimed. It is intended that the patent shall cover by suitable expression in the appended claims, whatever features of patentable novelty exist in the invention disclosed.

What is claimed is:

1. A pressure measuring device comprising:
    a first pressure transducer adapted to measure a first pressure and including a first plurality of piezoresistive devices;
    a second pressure transducer adapted to measure a second pressure and including a second plurality of piezoresistive devices; and,
    means for selectively coupling:
        a first set of said first plurality of piezoresistive devices to a first set of said second plurality of piezoresistive devices to measure a difference between said first and second pressures; and,
        said first set of said first plurality of piezoresistive devices to a second set of said second plurality of piezoresistive devices to measure a sum of said first and second pressures.

2. The device of claim 1, further comprising a resistive structure, wherein said means is further for selectively coupling said first set of said first plurality of piezoresistive devices to said resistive structure to measure said first pressure.

3. The device of claim 1, further comprising a resistive structure, wherein said means is further for selectively coupling said first set of said second plurality of piezoresistive devices to said at least one resistive structure to measure said second pressure.

4. The device of claim 1, further comprising a resistive structure, wherein said means is further for selectively coupling:
    said first set of said first plurality of piezoresistive devices to said resistive structure to measure said first pressure; and,
    said first set of said second plurality of piezoresistive devices to said at least one resistive structure to measure said second pressure.

5. The device of claim 1, wherein said first and second pressure transducers are absolute pressure transducers.

6. The device of claim 5, wherein said first plurality and said second plurality of piezoresistive devices are each respectively configured in two uncoupled half-bridges.

7. The device of claim 6, wherein each of said half bridge piezoresistive structures comprises two piezoresistors.

8. The device of claim 4, wherein said resistive structure comprises two resistors coupled in a half-bridge configuration.

9. The device of claim 8, wherein each of said two resistors has a substantially identical predetermined percentage change of resistance for the same pressure.

10. A method for measuring pressures comprising the steps of:
    providing a first pressure transducer adapted to measure a first pressure and including a first plurality of piezoresistive devices;
    providing a second pressure transducer adapted to measure a second pressure and including a second plurality of piezoresistive devices;
    selectively coupling a first set of said first plurality of piezoresistive devices to a first set of said second plurality of piezoresistive devices to measure a difference between said first and second pressures; and,
    selectively coupling said first set of said first plurality of piezoresistive devices to a resistive structure to measure said first pressure or said first set of said second plurality of piezoresistive devices to said resistive structure to measure said second pressure.

11. The method of claim 10, further comprising the step of selectively coupling said first set of said first plurality of piezoresistive devices to a second set of said second plurality of piezoresistive devices to measure a sum of said first and second pressures.

12. The method of claim 10, further comprising the step of selectively coupling said first set of said first plurality of piezoresistive devices to a resistive structure to measure said first pressure and said first set of said second plurality of piezoresistive devices to said resistive structure to measure said second pressure.

13. A combination absolute and differential pressure sensing device comprising:
    a plurality of absolute pressure transducers each respectively comprising a plurality of half bride piezoresistive structures;
    at least one resistor; and
    a switching device for selectively coupling at least one of said plurality of half bridge piezoresistive structures of a first one of said absolute pressure transducers to said at least one resistor to form a half-active full bridge structure adapted to measure a first absolute pressure; and said at least one half bridge piezoresistive structures of said first one of said plurality of absolute pressure transducers to at least one of said half bridge piezoresistive structures of a second one of said plurality of absolute pressure transducers to form a full bridge structure adapted to measure a differential pressure.

14. The device of claim 13, wherein said switching device further selectively couples said at least one other of said plurality of half bridge piezoresistive structures of said first one of said plurality of absolute pressure transducers to said at least one of said half bridge piezoresistive structures of said second one of said plurality of absolute pressure transducers to form a full bridge structure adapted to measure a sum of two applied pressures.

15. The device of claim 13, wherein said switching device further selectively couples said at least one of said plurality of half bridge piezoresistive structures of said second one of said absolute pressure transducers to said at least one resistor to form a half-active full bridge structure adapted to measure a second absolute pressure.

16. The device of claim 13, wherein said plurality of absolute pressure transducers consists of two absolute pressure transducers.

17. The device of claim 16, wherein said plurality of half bridge piezoresistive structures on each of said two absolute pressure transducers comprises two half bridge piezoresistive structures.

18. The device of claim 17, wherein each of said half bridge piezoresistive structures comprises two piezoresistors having substantially identical performance characteristics.

19. The device of claim 13, wherein said plurality of resistors comprises two resistors.

20. The device of claim 19, wherein each of said two resistors has a substantially same predetermined resistance.

* * * * *